United States Patent
Veerasamy (10) Patent No.: US 9,951,552 B2
(45) Date of Patent: Apr. 24, 2018

(54) GLAZING WITH HEAT FLUX SENSOR AND/OR METHODS OF MAKING THE SAME

(71) Applicant: Guardian Glass, LLC, Auburn Hills, MI (US)

(72) Inventor: Vijayen Veerasamy, Ann Arbor, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 209 days.

(21) Appl. No.: 14/721,163

(22) Filed: May 26, 2015

(65) Prior Publication Data

US 2016/0348420 A1    Dec. 1, 2016

(51) Int. Cl.
*E06B 3/67* (2006.01)
*B32B 17/06* (2006.01)
(Continued)

(52) U.S. Cl.
CPC .......... *E06B 3/6722* (2013.01); *B32B 17/06* (2013.01); *E06B 9/24* (2013.01); *G02F 1/137* (2013.01); *G02F 1/1334* (2013.01); *G02F 1/13306* (2013.01); *G02F 1/163* (2013.01); *B32B 7/08* (2013.01); *B32B 17/061* (2013.01);
(Continued)

(58) Field of Classification Search
CPC ........ E06B 3/6722; E06B 3/6715; E06B 9/40; E06B 9/92; B32B 17/06; B32B 17/061; B32B 7/08; B32B 2009/2476; G02F 1/163; G02F 1/137; G02F 1/1334; C01J 5/12; C01J 5/16; F24F 2011/0049
See application file for complete search history.

(56) References Cited

U.S. PATENT DOCUMENTS 3,355,589 A * 11/1967 Clifford .................... G01J 1/16
                                                                250/338.1
4,555,764 A * 11/1985 Kuehn .................... F24J 2/0007
                                                                126/585
(Continued)

FOREIGN PATENT DOCUMENTS

EP        0 679 924        11/1995

OTHER PUBLICATIONS

U.S. Appl. No. 14/466,217, filed Aug. 22, 2014, Frey et al., 45 pp.
(Continued)

*Primary Examiner* — Donald J Loney
(74) *Attorney, Agent, or Firm* — Nixon & Vanderhye P.C.

(57) ABSTRACT

Certain example embodiments relate to a glazing assembly including a first glass substrate. A radiation shield covering, directly or indirectly, at least a part of a peripheral edge area of the first glass substrate. A dual junction solid-state heat flux sensor includes a first junction oriented in the assembly at a first location at which radiation from a radiation source is receivable through the first glass substrate; a second junction oriented in the assembly at a second location that is blocked from the radiation source by the radiation shield; and circuitry configured to generate a signal based on a differential between transduced voltages respectively generated at the first and second junctions. A control module may be configured to receive the signal and selectively generate an action responsive thereto.

8 Claims, 9 Drawing Sheets

(51) Int. Cl.
G02F 1/163 (2006.01)
G02F 1/137 (2006.01)
G02F 1/1334 (2006.01)
E06B 9/24 (2006.01)
G02F 1/133 (2006.01)
E06B 9/40 (2006.01)
B32B 7/08 (2006.01)
E06B 9/92 (2006.01)
F24F 11/00 (2018.01)

(52) U.S. Cl.
CPC ....... B32B 2307/20 (2013.01); B32B 2307/30 (2013.01); B32B 2307/71 (2013.01); B32B 2419/00 (2013.01); E06B 3/6715 (2013.01); E06B 9/40 (2013.01); E06B 9/92 (2013.01); E06B 2009/2464 (2013.01); F24F 2011/0049 (2013.01); G02F 2001/13312 (2013.01)

(56) References Cited

U.S. PATENT DOCUMENTS

| | | | |
|---|---|---|---|
| 7,190,506 | B1 | 3/2007 | Berneth et al. |
| 7,375,871 | B2 | 5/2008 | Libretto et al. |
| 7,411,716 | B2 | 8/2008 | Oh et al. |
| 7,450,294 | B2 | 11/2008 | Weidner |
| 7,511,872 | B2 | 3/2009 | Tonar et al. |
| 7,525,714 | B2 | 4/2009 | Poll et al. |
| 7,547,658 | B2 | 6/2009 | Liu et al. |
| 7,545,551 | B2 | 9/2009 | Yoshimura et al. |
| 8,289,610 | B2 | 10/2012 | Veerasamy |
| 2006/0077167 | A1 | 4/2006 | Kim et al. |
| 2007/0148379 | A1 | 6/2007 | Theios et al. |
| 2009/0115922 | A1 | 5/2009 | Veerasamy |
| 2014/0176836 | A1 | 6/2014 | Brecht et al. |
| 2014/0236323 | A1 | 8/2014 | Brown et al. |

OTHER PUBLICATIONS

R. Clark Jones, "A New Classification System for Radiation Detectors," Journal of the Optical Society of America, vol. 39, No. 5., pp. 327-343, May 1949.

Dillner et al., "Figures of Merit of Thermoelectric and Bolometric Thermal Radiation Sensors," Journal of Sensors and Sensor Systems (JSSS), Jun. 21, 2013, pp. 85-94.

R. Clark Jones, "Proposal of the Detectivity D** for Detectors Limited by Radiation Noise," Journal of the Optical Society of America, vol. 50., No. 11, pp. 1058-1059, Nov. 1960.

* cited by examiner

GLAZING WITH HEAT FLUX SENSOR AND/OR METHODS OF MAKING THE SAME

TECHNICAL FIELD

Certain example embodiments of this invention relate to a glazing with a heat flux sensor, and/or a method of making the same. More particularly, certain example embodiments of this invention relate to using a single or multiple junction solid-state heat flux sensor provided to a glazing to selectively trigger an appropriate action in response to detected heat fluxes, and/or associated methods. Appropriate actions may include, for example, activation or deactivation of a switchable glazing, adjustment of a localized or central heating and cooling system, actuation of a vent etc. (e.g., with a view of energy efficient temperature and comfort control).

BACKGROUND AND SUMMARY OF EXAMPLE EMBODIMENTS OF THE INVENTION

Motivated by building codes, national regulations, the general desire to save energy, and/or the like, some building designers, architects, and owners make calculations and predictions about building energy consumption. In general, it is desirable to reduce the energy a building consumes, thereby potentially reducing total occupancy costs (e.g., through lower heating and/or cooling costs), providing "greener" or more environmentally-conscious structures, etc.

Windows are bi-directional energy pathways in a building envelope and as such oftentimes have a large influence on the energy exchange balance between the building and its environment. Whether specifically marketed under the name "net zero energy buildings" or a like term, there is a trend towards the construction of buildings that use no more energy than they produce.

Given this background, so-called "smart windows" or glazings that are able to individually measure the heat energy flux traversing through them are starting to have a reason to exist. For instance, smart windows can in some instances allow lighting to be used more cost effectively through improved light management, cut down on the use of air-conditioning and heating through improved thermal management, etc. For instance, with respect to the former, switchable glazings (such as, for example, glazings incorporating polymer-dispersed liquid crystal (PDLC) materials, polymer-assembled liquid crystal (PALC) materials, electrochromic, electrochromic/photochromic hybrids, etc.) may be activated or deactivated to allow more or less light to pass into (or redirected through) a building. In order to achieve the latter, for example, it would be desirable to have information regarding the thermal flux through a building envelope, e.g., for localized and/or automatic temperature control and, thus, to make adjustments that have an impact on the overall building energy consumption.

In order to aid in achieving the above-identified and/or other aspects, it may be possible to integrate heat flux sensors into glazings. In this regard, the inventor of the instant application has observed that heat flux incident on a building envelope sets up a temperature field or spatial temperature gradient, both perpendicular and parallel to the glazing By measuring this temperature gradient (whether in a steady state or transient mode), it becomes possible to measure with a high accuracy the instantaneous heat flux through the window.

By simultaneously performing this measurement over several window locations on a building envelope or façade, one can compute the instantaneous net heat flux (or its time differential) passing in to or out of a building envelope with high precision. This information can be used to trigger many different actions such as, for example, dimming or brightening a switchable glazing, triggering localized heating or air-conditioning events in lieu of central functions, etc.

Such sensors may be small in size, possess power autonomy, and be integrated with relative ease into modern glazings. Such sensors also may be used in automotive applications (such as, for example, laminated in automotive sunroofs, windshields, etc.), refrigerator/freezer doors, etc. As such, they may be used to trigger automotive shades to be opened/closed to increase/decrease heat in the cabin of the vehicle, trigger cooling to help reduce the likelihood of food spoiling, etc.

In certain example embodiments of this invention, a glazing assembly including a first glass substrate is provided. A radiation shield covering, directly or indirectly, at least a part of a peripheral edge area of the first glass substrate. A dual junction solid-state heat flux sensor includes a first junction oriented in the assembly at a first location at which radiation from a radiation source is receivable through the first glass substrate; a second junction oriented in the assembly at a second location that is blocked from the radiation source by the radiation shield; and circuitry configured to generate a signal based on a differential between transduced voltages respectively generated at the first and second junctions.

According to certain example embodiments, a control module may be configured to receive the signal and selectively generate an action responsive thereto. For instance, the control module may be used to selectively trigger an action to be taken in a system external to the glazing and/or with respect to the glazing itself.

In certain example embodiments of this invention, a method of making a glazing assembly is provided. The method comprises: covering, directly or indirectly, at least a part of a peripheral edge area of a first glass substrate with a radiation shield; connecting a dual junction solid-state heat flux sensor to the first glass substrate, so that a first junction of the sensor is oriented in the assembly at a first location at which radiation from a radiation source is receivable through the glass substrate, and a second junction of the sensor is oriented in the assembly at a second location that is blocked from the radiation source by the radiation shield; and providing circuitry configured to generate a signal based on a differential between transduced voltages respectively generated at the first and second junctions.

Methods of using the glazings described herein also are provided in certain example embodiments.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to glazings with heat flux sensors, and/or methods of making the same. Direct measurement of glass surface temperature using thermocouples can be very challenging, as both accuracy and precision can be affected by exposure to direct sunlight, as well as energy exchange with convective air currents. Winds and/or other loads on a window can, for example, cause thermo-decoupling/de-bonding of thermal contacts.

Certain example embodiments therefore use a dual junction solid-state heat flux sensor whereby incident heat flux can be extracted by having one junction exposed directly to the heat source (radiative, convective, or conductive), while the other junction is thermally isolated and shielded from the source. The operation principle is based on a two-step sensing process in certain example embodiments. That is, in certain example embodiments, the process involves radiation to thermal transduction, and thermal to electrical transduction. Further information can be found in, for example, U. Dillner et al.: Figures of merit of thermoelectric and bolometric thermal radiation sensors, J. Sens. Sens. Syst., 2, 85-94, 2013, as well as R. C. Jones: A new classification system for radiation detectors, J. Opt. Soc. Am., 39, 327-343, 1949—the entire contents of each of which are hereby incorporated herein by reference.

Figure 1:
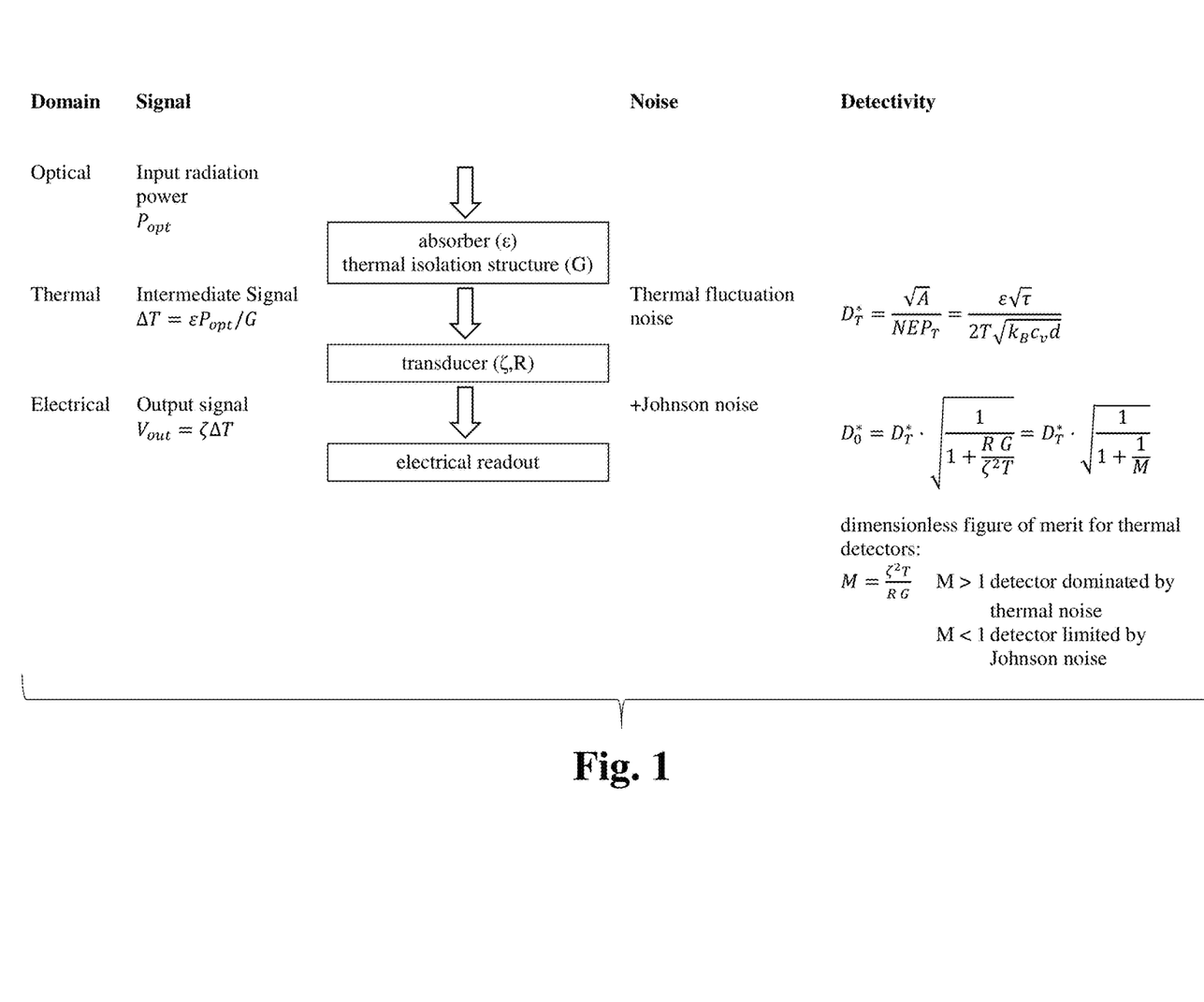
FIG. 1 is a diagram showing the working principal behind a thermal radiation detector, including the signal generation, the main sources of noise, and the resulting specific detectivity, which may be used in connection with certain example embodiments.

In this regard, and referring now more particularly to the drawings in which like reference numerals indicate like parts throughout the several views, the FIG. 1 diagram shows the working principal behind a thermal radiation detector, including the signal generation, the main sources of noise, and the resulting specific detectivity, which may be used in connection with certain example embodiments. An absorber layer is used to convert incident radiation to heat energy. The absorber layer may include a high-emissivity material such as, for example, black frit, carbon epoxy, soot, a material including carbon black, carbon nanotubes, and/or the like.

The optical domain thus receives input radiation power ($P_{opt}$), which is converted into an intermediate signal indicative of information in the thermal domain. The intermediate signal is converted into the electrical output signal using a temperature (difference) transducer. More particularly, the intermediate signal ($\Delta T = \epsilon P_{opt}/G$) indicates that the temperature difference ($\Delta T$) is equal to the absorber value ($\epsilon$) multiplied by the input radiation power, divided by the heat conductance (G).

The thermal sensor principle constitutes the fundamental difference between thermal and photonic radiation sensors (e.g., photoconductors or photodiodes or solar cells) based on quantum detection. Desirable features of thermal sensors may in certain example implementations include uncooled operation and broadband response (e.g., over the infrared spectrum as enabled by appropriate volume absorbers or the like). Some radiation sensors may require sunlight and thus be limited to daylight applications.

Radiation sensors can be characterized by several measured quantities such as, for example, responsivity, time constant, and noise equivalent power (NEP), which can be significant parameters when assessing the suitability of a given radiation sensor for a specific application. For a comparison of various radiation sensors, it is expedient to condense these parameters, preferably into a single number serving as a figure of merit, which can help the potential user of these sensors to rate its performance (and in essence help as a sort of calibration).

The thermal isolation structure, which is necessary to generate the temperature difference $\Delta T$ as the intermediate signal of the thermal sensor, is characterized by its heat capacitance C and heat conductance G. If it is assumed t that the thermal isolation structure is a film of thickness d and a size essentially comprising the receiving area A of the sensor, which results in a volume $V=Ad$, then the heat capacitance can be readily calculated from the corresponding specific quantities, i.e., the volumetric heat capacity $c_V$ and the heat capacity per unit area $c_A = c_V d$, so that:

$$C = c_V V = c_A A \tag{1}$$

The heat conductance results from the temperature difference $\Delta T$ generated by the heat load P applied at the membrane according to:

$$G = P/\Delta T. \tag{2}$$

Corresponding to the membrane geometry, it can be useful to relate the thermal conductance to the receiving area by a heat transfer coefficient:

$$U = G/A. \tag{3}$$

The total heat transfer comprises three components: Heat transfer by radiation ($U_R$), by conduction of the functional layers forming the temperature transducer ($U_C$), and by parasitic heat flows ($U_P$) originating, for example, from a surrounding gas atmosphere or any layers of the thermal isolation structure other than the functional layers considered above. Thus:

$$s = \Sigma_i U_i = U_R + U_C + U_P, \tag{4}$$

(index i=R, C, P). The heat transfer by radiation sets a minimum for the total heat transfer. Its heat transfer coefficient can be calculated from Stefan's law, assuming $\Delta T \ll T$, which results in $$U_R = 4\epsilon\sigma_{SB}T^3 \quad (5)$$

Here $\epsilon$ is the absorptivity or emissivity of the receiving area, $\sigma_{SB}$ the Stefan-Boltzmann constant, and T the operational temperature. Equation (5) yields Ur=6.12 W m$^{-2}$ K$^{-1}$ at T=300 K and $\epsilon$=1. The heat transfer by conduction of the functional layers is proportional to their thermal conductivity $\kappa$. Thus:

$$U_c = \kappa/g, \quad (6)$$

where g is a geometric factor related to the dimensions of the sensor and thus expressed in length units.

The voltage difference between the exposed junction and the shielded (or "hidden") junction is given by:

$$\Delta V = \frac{S\varepsilon}{A_s}(P_{inc} - P_{amb}), \quad (7)$$

where S is the Seebeck coefficient (which will be recognized by those skilled in the art as being a measure of the magnitude of an induced thermoelectric voltage in response to a temperature difference across that material), $A_s$ is the area of the sensor, $P_{inc}$ is the power of the incident radiation (heat), and $P_{amb}$ is the power of the ambient radiation (heat). This follows because the incoming heat flux Q is equal to the the power of the incident radiation (heat) divided by the area of the sensor (Q=$P_{inc}/A_s$).

Figure 2:
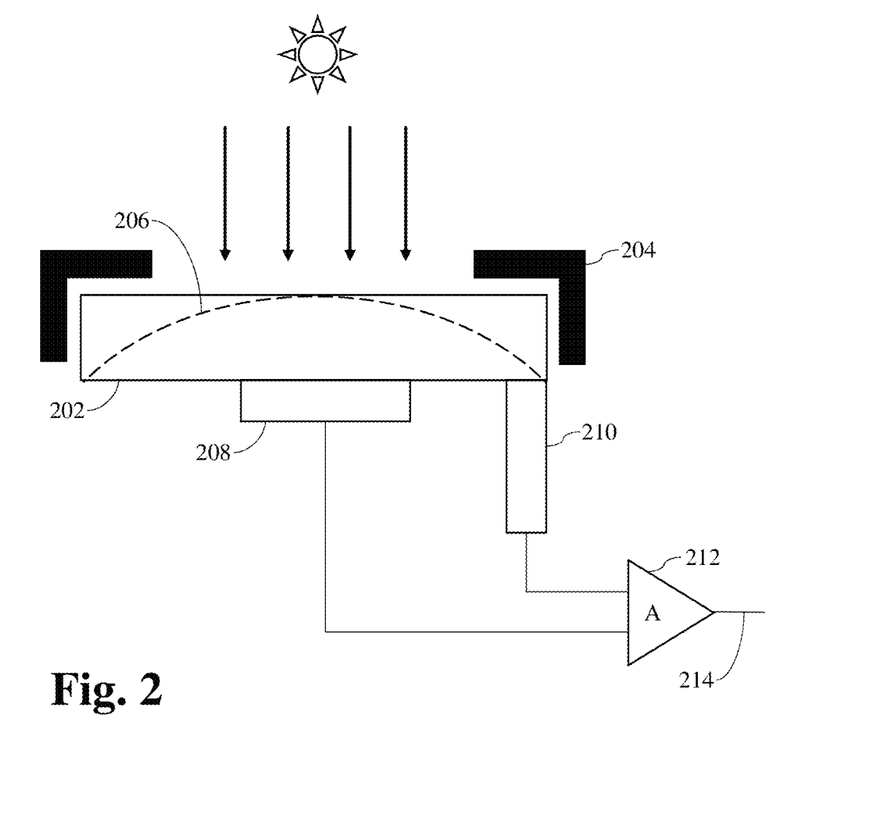
FIG. 2 a simplified schematic view of a cross-section of a glazing, including a differential mode flux sensor and associated circuitry, which may be used in connection with certain example embodiments.

This differential scheme may be achieved via a differential op-amp circuitry, which lends itself to amplification with a gain. This allows the signal-to-noise ratio to be improved as well as ambient noise cancellation. For instance, typical blackbody materials (e.g., of or including silicon) may produce signals on the orders of millivolts (e.g., up to 10, 20, 30, or more millivolts), but op-amp circuitry may be used to increase the gain by 60-1,000 times (or even more) in certain example embodiments, e.g., to make the signal more usable. FIG. 2 is a simplified schematic view of a cross-section of a glazing, including a differential mode flux sensor and associated circuitry, which may be used in connection with certain example embodiments. That is, FIG. 2 includes a glass substrate 202 with a radiation shield 204. The radiation shield may be, for example, a black frit perimeter, a sash, bezel, frame, or the like. When light impinges on the substrate 202, it sets up a temperature profile or gradient in the glass. The temperature profile or gradient may have heat flux in any directions spanning both parallel and perpendicular to the glass. An example profile 206 is shown in FIG. 2, although it will be appreciated that other profiles may exist based on, for example, position of the sun relative to the window, etc.

A first junction 208 is directly exposed to the incoming radiation and thus may be considered the hot junction. On the other hand, a second junction 210 is shielded from the incoming radiation by the radiation shield 204, it may be considered the cold junction. The difference between the sensed temperature at the hot and cold junctions provides a voltage (such that, for example, V=S($T_h$−$T_c$)), which may be processed at the op-amp circuitry 212, e.g., to produce a voltage 214 that is proportional to the incoming heat flux Q (where Q=K V/S).

The sensors may be integrated in one chip package. The chip package may contain several junctions that are connected in series. For example, there may be two sets of junctions, namely the hot and cold junctions. The chip package may then be affixed or soldered on flexible printed circuit boards (FPCs) with two metal pads (hot and cold), in certain example embodiments. For simplicity, certain example embodiments may involve the two junctions being fabricated using poly-Si to have the same Seebeck coefficient S, $U_s$ value, detection area $A_s$, and emissivity $\epsilon$. Then, the sensor voltage allows for the calculation of heat flux using equation (7) above. Furthermore, by further having access to the temperature difference between the two junctions, the U-value of the glazing can be deduced, as follows:

$$U_{glazing} = \frac{\Delta V}{dT_j} = \frac{S\varepsilon}{A_s U_s} \times \frac{(P_{inc} - P_{amb})}{\Delta T} = \frac{\Delta V}{\Delta T_j} \times \frac{U_s}{S\varepsilon} \quad (8)$$

In certain example embodiments, the area of the sensor may be selected so as to help control the rate at which the sensor output changes. It has been found that sensors that change output too quickly and that change too slowly are undesirable. With regard to the former, for example, erroneous detections may be made and thus erroneous actions made be triggered (e.g., unless downstream noise reduction, filtering, correlation techniques, and/or the like are implemented to help avoid such false positives). With regard to the latter, for example, rapid though bona fide changes may not be detected, thereby leading to potentially harder to correct false negative situations.

Figure 3:
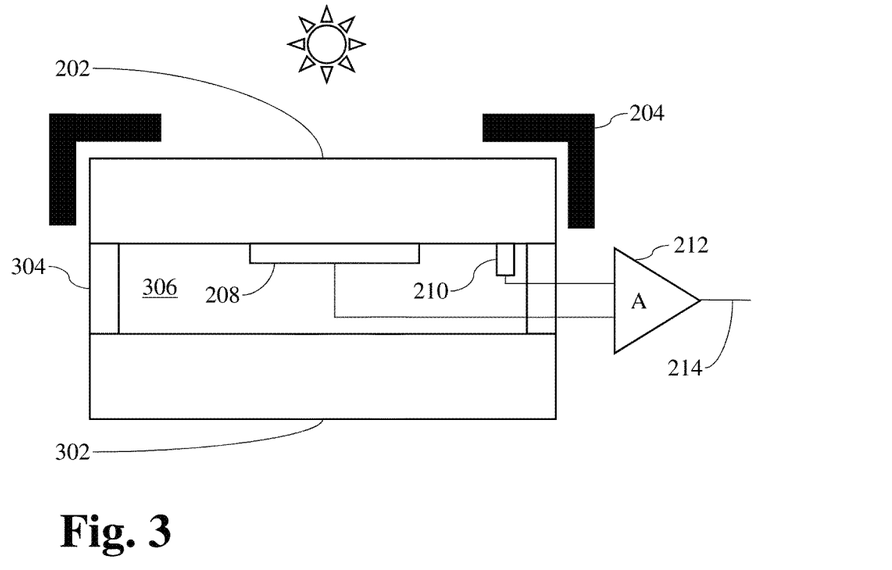
FIG. 3 is an example insulating glass (IG) unit incorporating the glazing of FIG. 2, in accordance with certain example embodiments.

The glazing of FIG. 2 may be used with or otherwise incorporated into a variety of different assemblies. For example, FIG. 3 is an example insulating glass (IG) unit incorporating the glazing of FIG. 2, in accordance with certain example embodiments. As shown in FIG. 3, a second substrate 302 is provided in substantially parallel spaced apart relation to the first substrate 202. A spacer or spacer system 304 helps maintain the first and second substrates 202 and 302 in this orientation and helps define a gap, space, or cavity 306 therebetween. The gap 306 may be filled with gas including an inert gas (e.g., Ar, Xe, Kr, or the like), with or without oxygen, in certain example embodiments. In certain example embodiments, the gap may be at least partially evacuated and filled with 80% argon and 20% oxygen or air.

Figure 4:
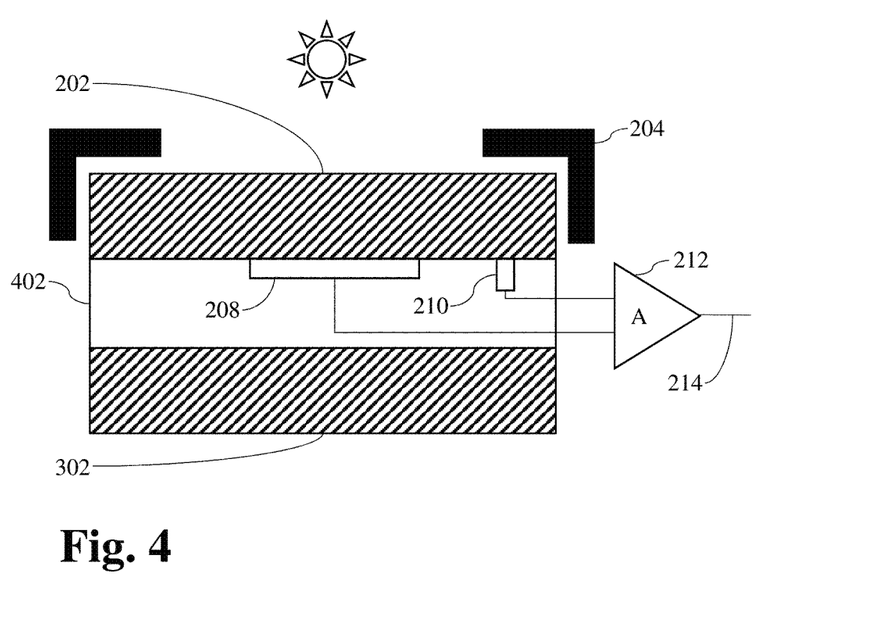
FIG. 4 is an example laminated glazing incorporating the glazing of FIG. 2, in accordance with certain example embodiments.

As another example, FIG. 4 is an example laminated glazing incorporating the glazing of FIG. 2, in accordance with certain example embodiments. As shown in FIG. 4, the first substrate 202 and the second substrate 302 are laminated to one another using at least one laminating interlayer 402. The at least one laminating interlayer 402 may include, for example, PVB, EVA, PET, PU, PMMA, and/or the like. In general, any polymer-inclusive interlayer, epoxy-based, or other material may be used to help secure together the first substrate 202 and the second substrate 302. In certain example embodiments, the sensor may be embedded in its own laminating layer, e.g., for protection purposes.

Figure 5:
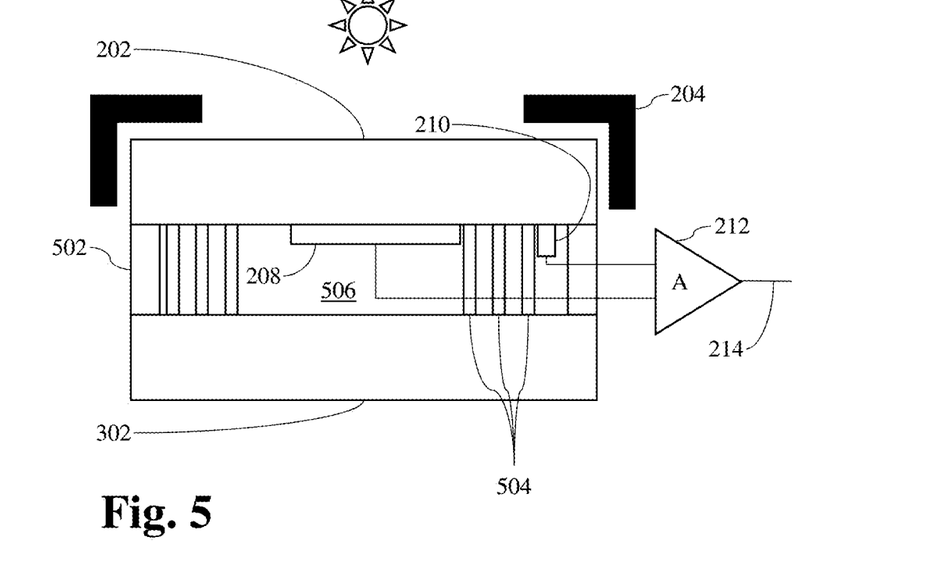
FIG. 5 is an example vacuum insulating glass (VIG) unit incorporating the glazing of FIG. 2, in accordance with certain example embodiments.

As another example, FIG. 5 is an example vacuum insulating glass (VIG) unit incorporating the glazing of FIG. 2, in accordance with certain example embodiments. As shown in FIG. 5, an edge seal 502 (e.g., of or include a frit material) is provided around the periphery of the first substrate 202 and/or the second substrate 302, and spacers or pillars 504 are provided in the cavity 506 provided between the first and second substrates 202 and 302. The cavity is evacuated to a pressure less than atmospheric, e.g., through a pump-out port or the like. The edge seal 502 helps to hermetically seal the VIG unit.

Figure 6:
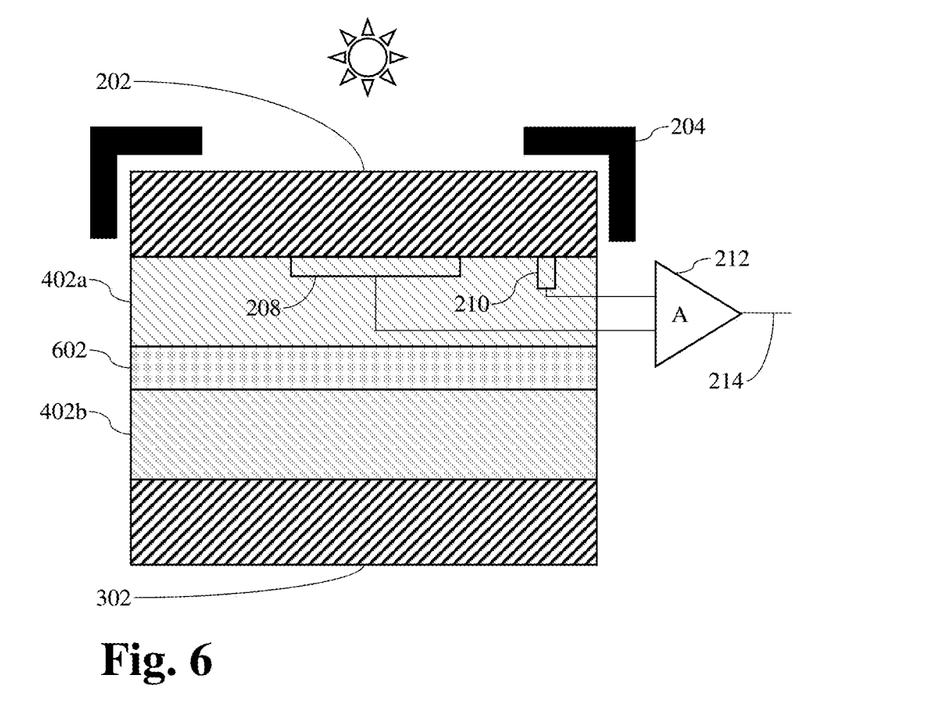
FIG. 6 is an example switchable glazing incorporating the glazing of FIG. 2, in accordance with certain example embodiments.

As yet another example, FIG. 6 is an example switchable glazing incorporating the glazing of FIG. 2, in accordance with certain example embodiments. The FIG. 6 switchable glazing may include an active layer or layer stack 602. For instance, the active layer or layer stack 602 may be a PDLC film, a PALC film, an electrochromic film, and/or the like. In the case of a PDLC or a PALC film, for instance, it may be advantageous to sandwich the film between first and second laminating layers 402a and 402b, in certain example embodiments. Example electrochromic coatings, fabrication methods, and the like that may be used in connection with certain example embodiments described herein are disclosed in, for example, U.S. Pat. Nos. 8,289,610; 7,547,658; 7,545,551; 7,525,714; 7,511,872; 7,450,294; 7,411,716; 7,375,871; and 7,190,506, the entire contents of each of which is hereby incorporated herein by reference. Example PDLC coatings, fabrication methods, and the like that may be used in connection with certain example embodiments described herein are disclosed in, for example, U.S. Publication Nos. 2014/0176836 and 2009/0115922, and Ser. No. 14/466,217 filed on Aug. 22, 2014, the entire contents of each of which is hereby incorporated herein by reference.

It will be appreciated that although certain example configurations have been provided, still other configurations are possible. For example, it is possible to move the junctions to another surface such as, for example, the second, third, or fourth surface in an IG, VIG, laminated, and/or other product. Frit may be provided on any one or more surfaces such as, for example, the first and fourth, second and third, first and third, and/or other combinations of one, two, three, or four surfaces, in different example embodiments. The glass and/or laminating materials may be tinted in certain example embodiments. In certain example embodiments, the glass may be heat treated (e.g., heat strengthened and/or thermally tempered), chemically strengthened, and/or the like. In certain example embodiments, one or more glass substrates may be replaced with other materials such as, for example, plastics, polymers, and/or the like. Thus, vacuum insulating panels (VIPs) are also contemplated herein.

It will be appreciated that the example glazings described herein may be used in a number of different applications including, for example, residential and/or commercial window applications, automotive applications, skylights, merchandizers (e.g., refrigerator and/or freezer doors), display packages, solar cells, greenhouses, etc. IG and/or VIG units may, for example, be used merchandizers, IG units may be used for building windows and/or skylights, laminated products may be used in automotive applications, etc. In greenhouse applications, for example, the technology used herein may be used to determine when to allow in more/less sunlight (e.g., for different plants that benefit from different amounts of sunlight, to build/reduce heat, etc.), when to vent an area (e.g., based on interior and/or exterior heat, etc.

Depending on the size of the envelope to be monitored, more or fewer sensors may be provided. For example, a typical automotive application may benefit from the presence of 2-3 sensors. A typical refrigerator/freezer similarly may benefit from the presence of 2-3 sensors. A commercial building window may occupy more space and thus may benefit from 3 or more sensors in some instances. Different embodiments may use more of fewer sensors.

In certain example embodiments, multiple sensors may be connected in series for one or both junctions, e.g., to create a larger temperature differential. This may be advantageous in some instances, e.g., as it may help to improve the accuracy of the measurements, while still maintaining small size sensors that react at appropriate rates. Minimization of the U-values may be advantageous for similar reasons and thus may be performed in certain example embodiments.

Figure 7:
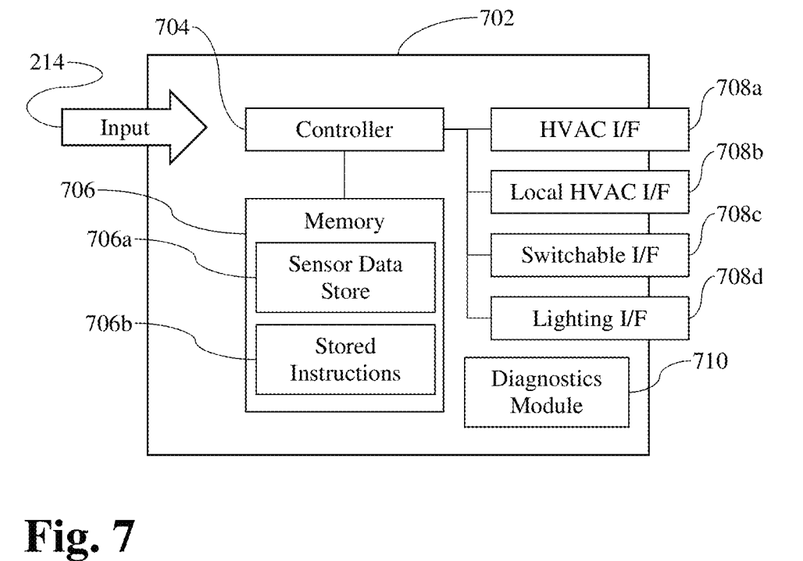
FIG. 7 is a block diagram showing control electronics that may be used in connection with certain example embodiments.

Referring once again to the drawings, FIG. 7 is a block diagram showing control electronics that may be used in connection with certain example embodiments. The example control unit 702 shown in FIG. 7 may be located on a common printed circuit board (PCB) as one or both junctions, or it may be located remote from the window. Input 214 from the sensor is received by the control unit 702 through a suitable interface. A controller 704, which may include one or more processors, ASICs, and/or the like, receives the input 214 and may store it in the memory 706. In this regard, historical data and/or the like may be stored to the sensor data store 706a section of the memory 706. The memory 706 may be any suitable combination of transitory or non-transitory memory such as, for example, RAM, ROM, flash memory, and/or the like. The controller 704 may consult stored instructions 706b to determine when and/or how to act on stored sensor data. For instance, pre-programmed rules may specify when to activate a switchable coating, turn on/off internal lighting, when/how to adjust a central HVAC unit, when/how to adjust a localized HVAC unit, etc. For instance, a temperature increase beyond a certain level over a predefined amount of time (e.g., a 5 degree increase over a 3 hour period) may trigger a switchable glazing to be changed to a non-transmissive state, local cooling, etc. A more rapid temperature increase may trigger central HVAC action. Similarly, high flux may indicate a significant amount of ambient light and thus may dim internal lighting as external lighting may be usable instead. The rules for activating HVAC systems may be based on published standards that link the outside temperature to the temperature to be maintained in commercial office buildings, best practice guidelines for maintaining an energy efficient home, etc.

In a similar fashion, vehicle sunroofs, vehicle windows, vehicle heating/cooling systems, etc., may be made to react. With respect to the former, mechanical shades may be closed, switchable glazings may be activated/deactivated, etc. Merchandizers may receive extra cooling when heat is detected (e.g., from a sunny day, a hand pressed against a glass window, etc.).

The various actions that are performable by the control unit 702 may be performed in connection with a series of interfaces. In this regard, FIG. 7 shows example interfaces for a central HVAC 708a, a local HVAC 708b, a switchable glazing 708c, and lighting 708d. It will be appreciated that more or fewer interfaces may be provided in different embodiments, e.g., based on the end application, the desired controls, etc.

In certain example embodiments, a diagnostics module 710 may run under the control of the controller 704 and potentially based on the information stored in the sensor data store 706a. The diagnostics module 710 may track the effective U-value or R-value of a window over time, which may be used to determine whether the window is failing, whether it is possible that an inert gas might be leaking out of an IG unit (thereby potentially posing a health or safety risk), whether it is possible that a VIG is losing vacuum, whether it is possible that a mirror in a solar application (e.g., an application including a concentrating solar photovoltaic mechanism, a concentrating solar mechanism with a heating tube or the like, a secondary reflector panel, and/or the like) is failing, etc. The diagnostics module 710 may cause an alarm to be raised, e.g., by wirelessly or otherwise transmitting information about a failure or expected failure to a remote system (e.g., a local or remote computer system, an application on an owner's smart device or computer, etc.), by causing an LED or other light to blink in a particular way (e.g., different color lights, blinking patterns, and/or the like to signal each different kind of failure that is tracked, etc.), and/or the like. The control unit 702 thus may include a wireless transmitter and/or may be operably connected to one or more indicator lights and/or the like.

Figure 8A:
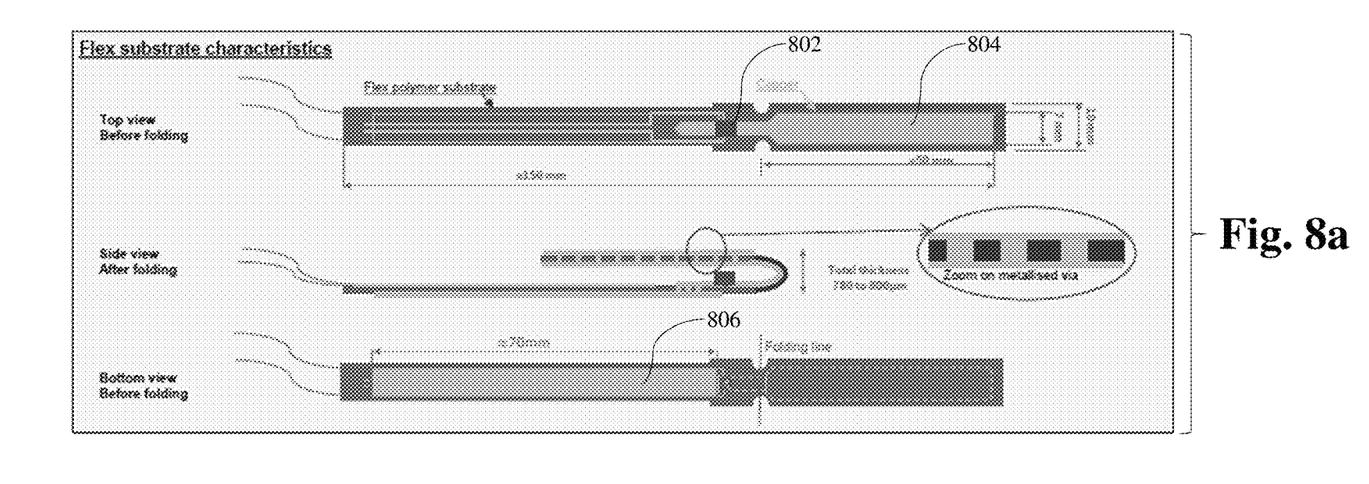
FIGS. 8a-8b show how two different example flexible substrates incorporating heat flux sensors may be structured and arranged for use in an example window application, in accordance with certain example embodiments.
Figure 8B:
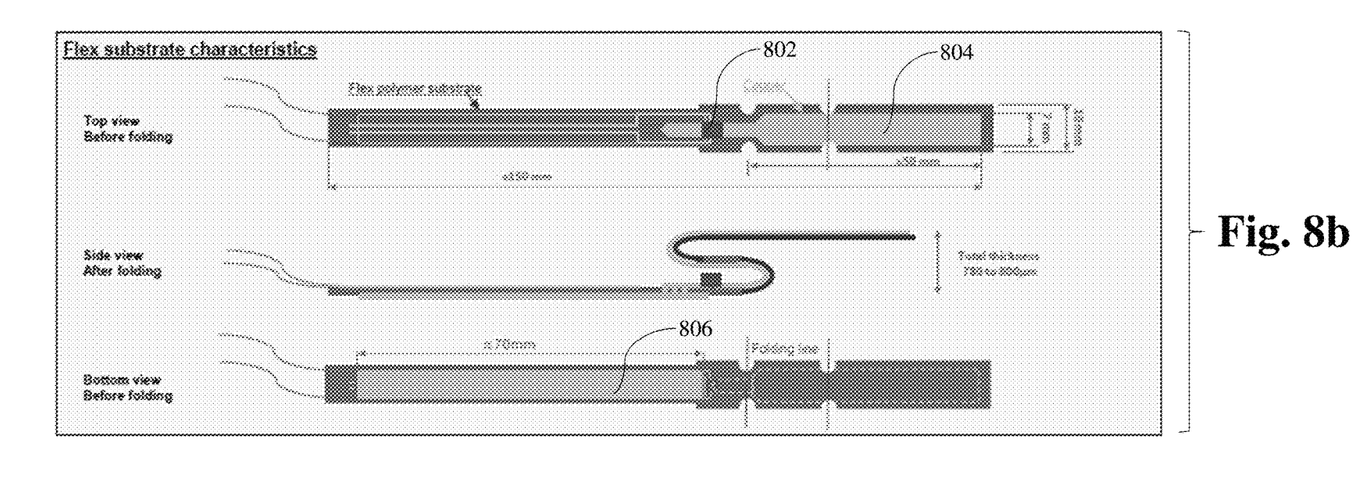

FIGS. 8a-8b show how two different example flexible substrates incorporating heat flux sensors may be structured and arranged for use in an example window application, in accordance with certain example embodiments. Each of FIGS. 8a-8b includes a heat sensor 802 located in the approximate center of each of the flexible substrates. The top surfaces of the flexible substrates support the hot junctions 804 (e.g., including a material such as, for example, copper or the like), and the bottom surfaces of the flexible substrates support the cold junctions 806 (e.g., also including a material such as, for example, copper or the like). As will be appreciated from FIGS. 8a-8b, the areas of the two contacts have almost the same dimensions in certain example embodiments and are provided on opposite sides of the same substrate (e.g., the same or similar heights and widths that differ from one another by no more than 20% in some examples, no more than 15% in other examples, and no more than 10% in still other examples). It will be appreciated that two or more sensor may be connected in series to amplify the output voltage prior to amplification, in certain example embodiments.

Metallized vias may be provided for thermalizing the system. The hot junction at the chip level therefore can be made hot and provide good thermal contact(s), while still permitting the system to function properly and provide a temperature gradient that is useful. The vias shown in the enlargement aid in thermally connecting the pad to the chip in certain example embodiments. There are also vias for electrical connection to chip in certain example embodiments.

Figure 9A:
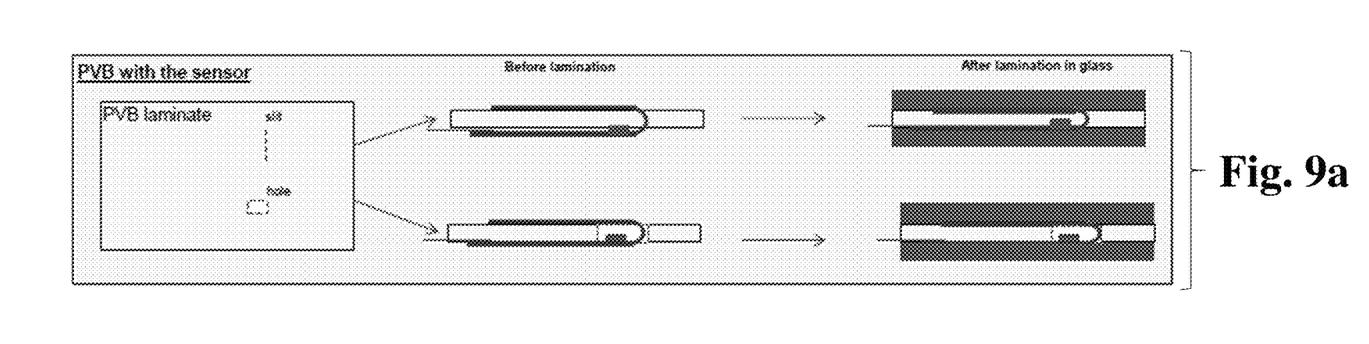
FIGS. 9a-9b show the arrangements in FIGS. 8a-8b being inserted into an example laminated window product, in accordance with certain example embodiments.
Figure 9B:
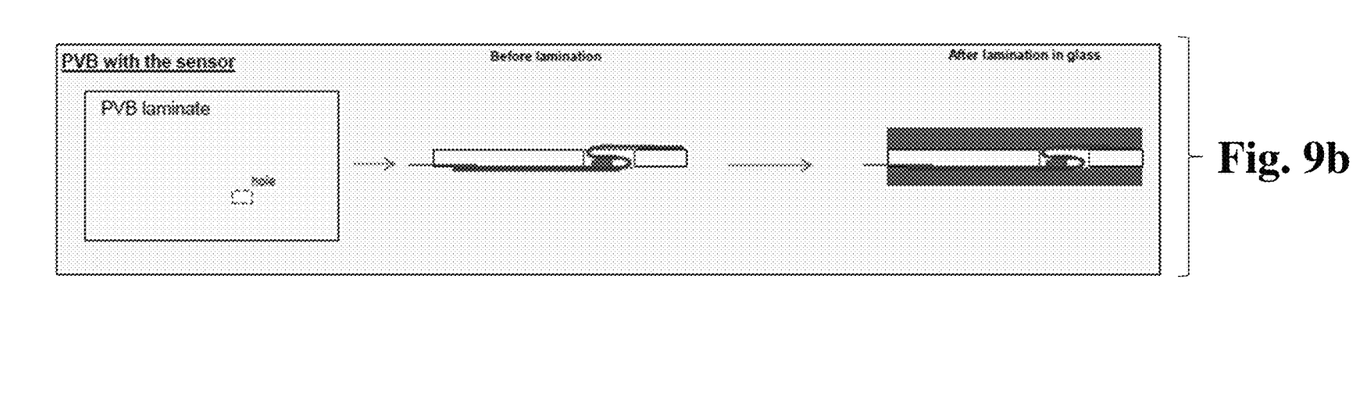

Each of the substrates is adapted to be folded in certain example embodiments. The FIG. 8a example shows folding into an example "C" shape (including where an example fold line could be located), and the FIG. 8b example shows folding into an example "Z" shape (including where example fold lines could be located). These arrangements could be inserted into any of the products described herein. In this regard, FIGS. 9a-9b show the arrangements in FIGS. 8a-8b being inserted into an example laminated window product, in accordance with certain example embodiments. For instance, as shown in FIG. 9a, the bend proximate the curve of the "C" is inserted through a slit formed in the laminate (e.g., a PVB laminate), and a hole formed in the laminate accommodates the sensor. The laminate wedge is laminated between two substrates. The FIG. 9b approach includes one hole for accommodating the folds of the substrate and the sensor. It will of course be appreciated that other flexible substrate designs, laminate arrangements, and/or the like, may be used in connection with different example embodiments.

Figure 10:
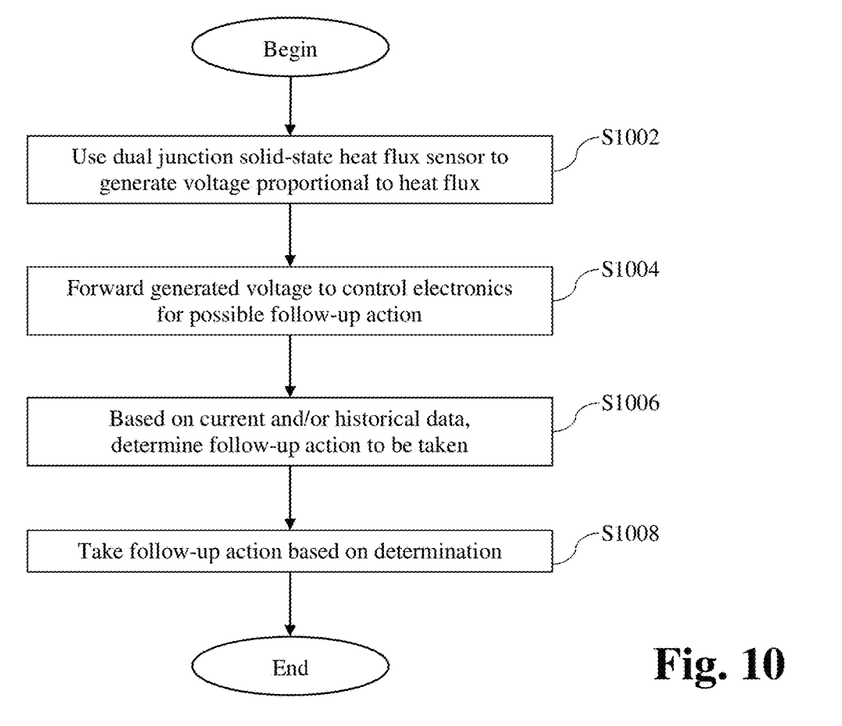
FIG. 10 is a flowchart showing an example process for sensing heat flux and taking an appropriate follow-up action, which may be used in connection with certain example embodiments.

FIG. 10 is a flowchart showing an example process for sensing heat flux and taking an appropriate follow-up action, which may be used in connection with certain example embodiments. A dual junction solid-state heat flux sensor or the like, e.g., as shown in FIG. 2, is used to generate voltage proportional to heat flux in step S1002. In step S1004, the generated voltage is forwarded to control electronics, e.g., as shown in FIG. 7, for possible follow-up action. Based on current and/or historical data from the sensor, a determination is made in step S1006 as to a follow-up action to be taken. The follow-up action may, for example, include sending a control signal to an external element via a suitable interface, store the received data (e.g., a temperature difference with a timestamp, identifier of the sensor that provided the data, etc.), and/or the like. The follow-up action is taken in step S1008, e.g., based on the determination reached in step S1006.

Samples

Samples were manufactured for preliminary testing purposes. In such samples, a layer of frit was deposited around at least one of a first and second substrates' peripheral edges on one side (or on one side each), and a layer comprising PVB was sandwiched therebetween. In some of these samples, PDLC foils were laminated within a glass structure inside a PVB matrix. The PDLC layer was switchable between opaque and transparent by the application of an electric field across it. The five configurations tested were as follows:

Sample 1: Clear glass with frit/0.76 mm PVB/0.76 mm PVB/clear glass with frit

Sample 2: Clear glass with frit/0.76 mm PVB/0.38 mm PVB/PDLC switchable layer with connections/0.76 mm PVB/clear glass with fit Sample 3: Tinted glass with fit/0.76 mm PVB with tint/0.38 mm PVB/clear glass Sample 4: Clear glass with frit/0.76 mm PVB/0.38 mm PVB/PDLC switchable layer with connections/0.38 mm PVB/clear glass with fit Sample 5: Tinted glass with fit/0.76 mm PVB with tint/0.38 mm PVB/tinted glass with fit For each sample, three modes of sensor configuration were involved. These modes included conduction, absorber, and reflector modes. The conduction mode measured heat flow between surfaces 2 and 3 of the assembly. The absorber mode measured radiation heat flow between a black patch on the sensor and surface 3. The reflector mode measured convective heat flow exchange between a white patch (e.g., of or include silver) on the sensor and an air gap (in case of an IG).

These three modes allow one to measure the heat flux, as well as the U-value of the glazing. It will be appreciated that greater precision of the U-value can be obtained by measuring the $\Delta T$ between two surfaces. In certain example embodiments, it is possible to segregate multiple sensors to measure these three modes more individually. Then, it becomes possible, for example, to solve a system with three equations to more instantaneously fingerprint and/or more longitudinally track the performance of the glazing on a system level.

Conductive sensors included 800 micron thick chips on a 1.6 mm thick PCB substrate, thermally connected to surfaces 2 and 3, with the connection from the PCB to surface 2 being accomplished using a copper pillar. For the conductive sensors, serigraphy was used to provide metallic thermal spreaders on surfaces 2 and 3. Radiative sensors included chips on 1.6 mm thick PCB substrate, thermally connected to surface 3. For the radiative sensors, serigraphy was used to provide metallic thermal spreaders on surface 3. For all sensors, a reflective Scotch tape was used to cover the chips, the PCB-to-surface 3 thermal connection and the electrical wiring, to help avoid thermal noise and improve sensitivity.

Preliminary measurements were carried out on the sensors during the course of the assembly, e.g., to help determine whether the example sensors were able to withstand typical lamination processes. These measurements included checks for sensor internal resistance (measured in MΩ, typically around 33 MΩ); backside thermal contact resistance (an empirical check using ice to check the sensor response to cold applied to surface 4 behind the sensor); and front-side thermal contact resistance (an empirical check using ice to ensure the sensor's response to cold applied to surface 1 above the sensor).

Following assembly, the sensors' response to various stimuli such as intentional heat, cold, and infra-red light was assessed. The measurements were carried out using either 3 Sineax V604 analog signal acquisition modules or LNA/ADC cards (up to 6) on an I²C bus with an Aardvark controller.

In all cases, the sensors' internal resistance was unchanged, confirming that the lamination process (which include a 270° C. tacking furnace and a production autoclave) had no measurable impact on the sensors.

Figure 11:
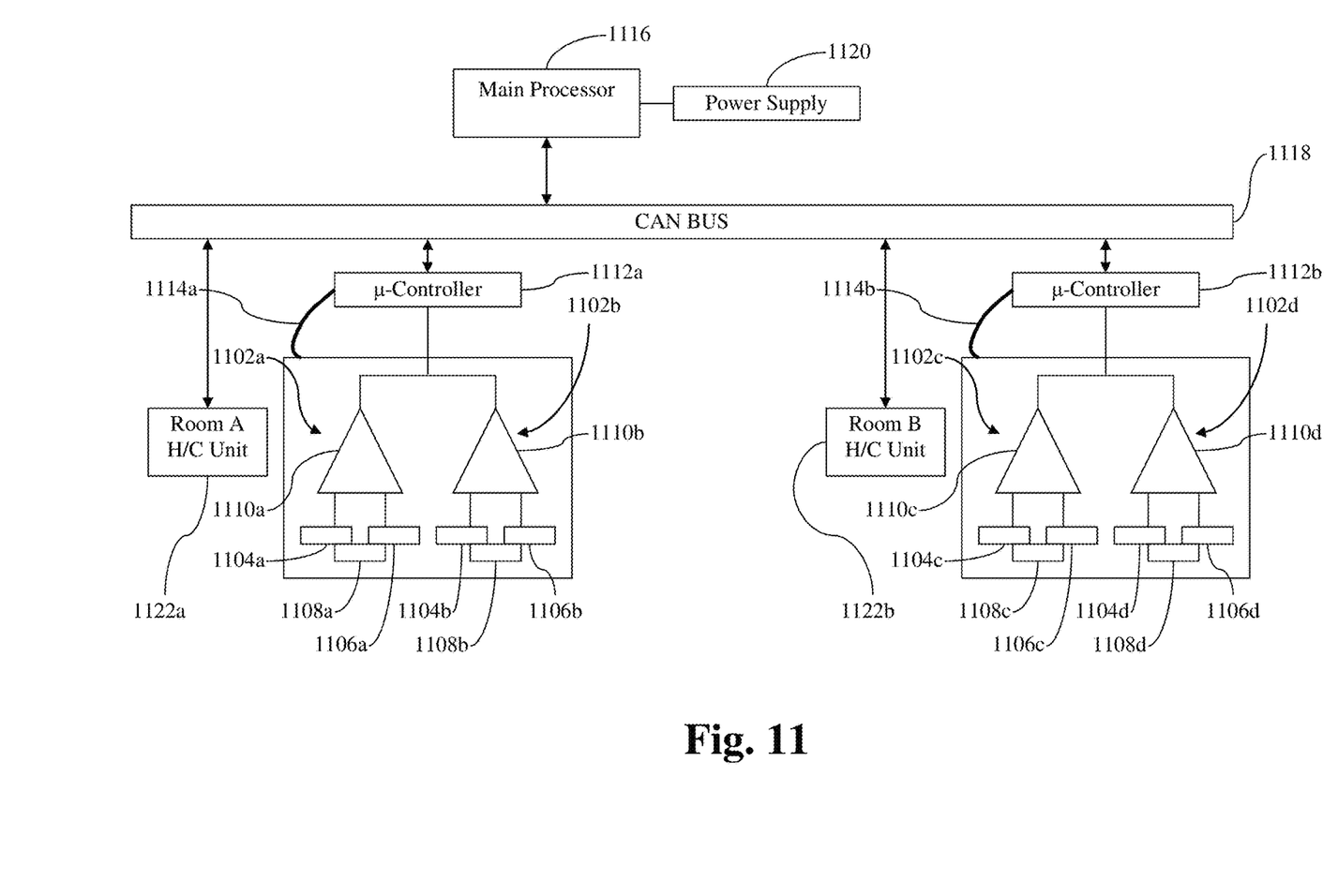
FIG. 11 is a block diagram showing how hardware and software elements may be configured, in accordance with an example embodiment.

FIG. 11 is a block diagram showing how hardware and software elements may be configured, in accordance with an example embodiment. FIG. 11 shows first and second sensors 1102a and 1102b, with respective hot and cold junctions 1104a-b and 1106a-b connected to or otherwise formed on respective analog-digital control (ADC) boards 1108a-1108b and with respective amplifiers 1110a-1110b. The ADC boards 1108a-1108b are connected to a first micro-controller 1112a. Thus, a thermocouple 1114a is in essence formed for a first room or zone. The first micro-controller 1112a communicates with a main processor 1116 via a CAN, LIN, or other data bus. The system is powered by a power supply 1120. Based on programming of the main processor 1116, a heating/cooling unit 1122a for a first room or zone can be controlled.

As will be appreciated from FIG. 11, a similar arrangement is provided for a second room or zone. That is, third and fourth sensors 1102c-1102d are provided with respective hot and cold junctions 1104c-d and 1106c-d and are connected to or otherwise formed on respective ADC boards 1108c-1108d. The ADC boards 1108c-1108d are connected to a second micro-controller 1112b, in essence forming another thermocouple 1114b for this second room or zone. The second micro-controller 1112b also communicates with a main processor 1116 via a CAN, LIN, or other data bus, and the main processor 1116 can take actions with respect to the heating/cooling unit 1122b for the second room or zone.

FIG. 11 shows two sensors in two zones. However, it will be appreciated that more or fewer sensors may be provided for any number of zones. For instance, for large areas, multiple sensors may be provided. One or more busses may be provided for connecting to one or more main processors.

The ADC boards 1108a-1108d may include connectors (e.g., wires) for the sensors 1102a-1102d, respectively, as well for connections to the CAN bus 1118 (e.g., for input and output) either directly or via the micro-controllers 1112a-1112b, respectively, in different example embodiments. On-board ADC functionality (e.g., for converting the raw sensor data into digital signals relayable over the CAN bus 1118) may be provided in certain example embodiments. In other example embodiments, the micro-controllers 1112a-1112b may be used for this and/or other purposes. A voltage regulator also may be provided on-chip.

The main processor 1116 may be a part of a computer or the like. In certain example embodiments, software modules of such a computer may facilitate the receipt and processing of data from the sensors 1102a-1102d. For example, application programming interfaces (APIs) may facilitate the retrieval of raw sensor data, the sending of control signals (e.g., report sensor data, cycle on/off, etc.), and/or the like. A control software module may process data and generate other information for visualization, reporting, etc. For example, real-time graphs of processed sensor data (e.g., indicating temperature at the sensor(s), temperature gradient across the product, etc.) may be displayed (e.g., on a display communicatively coupled to the computer), etc. More historical log files may be generated, processed and/or stored in an Excel spreadsheet or other like spreadsheet or database file, and they may be used to create graphs and/or other visualizations, as well.

It will be appreciated that multiple junctions, both multiple hot and multiple cold junctions, may be provided on a single chip in certain example embodiments. For instance, a single chip for a single zone may include many junctions in series all inside the chip, but to the outside each chip may have two input electrodes, one hot and one cold.

It will be appreciated that the FIG. 11 example configuration is just one sample, and that other hardware and/or software configurations may be usable in window and/or other products.

Although certain example embodiments schematically illustrate the hot junction of the sensor being in a central area of a substrate, it will be appreciated that that junction may be provided elsewhere, e.g., provided that it still receives the flux. Moving the sensor to a different location on the same surface or moving it to another surface may require alternative calibration in some instances.

It will be appreciated that although certain example embodiments refer to heat sensors or heat flux sensors, such sensors may be used to measure radiation, conduction, convection, and/or combinations thereof, e.g., at the same and/or different times. Such sensors in certain example embodiments may additionally or alternative measure phase changes in a product such as a window including, for example, condensation. For instance, if one of pads is dry and hidden (e.g., concealed behind a radiation or other barrier) while the other is exposed to water condensation, one side of the junction will "see" an influx of heat even though there is no temperature change.

With respect to the use of sensors to measure radiation, conduction, convection, and/or combinations thereof, it is possible in certain example embodiments to measure these three modes with three different sensors. For example, with respect to radiation, the Heat flux sensors may be calibrated using radiation heat sources that are consistently repeatable sources and thus effective for calibration purposes. However, the fraction of the radiation absorbed by the sensor, or its emissivity ($\epsilon$), in practice almost certain will not be 100%, so the absorbed heat flux will differ from the incident heat flux. In other words, an assumption is made that the sensor includes a "graybody," whose absorptivity and emissivity are equal. Heat flux sensors can measure the absorbed heat flux, regardless of its source or the mode of heat transfer. Sensors therefore may be coated black with carbon black, black paint, DLC, etc. (e.g., as indicated above), to help boost emissivity so that the absorbed radiation is nearly equal to the incident radiation. The relation of incident and absorbed heat flux for a radiation source is given by the following equation:

$$q''_{absorbed} = \epsilon q''_{absorbed}.$$

With respect to conduction, when the heat flux is not from a radiation source, emissivity is not necessarily an issue. For a conductive heat flux, for example, where the sensor is in direct contact with a heated material, the governing equation at the material surface is:

$$Q_{inc} = Q_{abs} = -k\, A(dT/dx),$$

where k is equal to the thermal conductivity of the sensor, and dT/dx is the thermal gradient with n as the unit vector perpendicular to the surface through which the heat flux is being measured.

Because the incident and absorbed heat flux are the same for a purely conductive heat flux, a heat flux sensor will read the actual incident heat flux. One caveat is that the sensor may need to have good thermal contact. For instance, if the contact is poor, there will effectively be a high thermal resistance between the sensor and the material of interest, which can alter the sensor reading and in some cases make them inaccurate.

For convective heat flux, the heat flux equation is:

$$q''_{absorbed} = h\Delta T,$$

where h is the heat transfer coefficient of the sensor, and $\Delta T$ is the temperature difference between the sensor and the fluid.

The heat transfer coefficient is a function of the fluid's thermal conductivity and the fluid flow characteristics. Unfortunately, fluid flow can be complex and difficult to model. The heat transfer coefficient therefore may be by measuring the surface heat flux. This procedure may assume that the heat transfer coefficient for the heat flux sensor and the surrounding system are the same, so that the incident and absorbed heat flux are equal. The accuracy of this assumption will vary with different system configurations and materials. A calibration may be performed to help account for determined regular variations.

Thus, it will be appreciated that all three modes of heat transfer can be measured, e.g., in the manners described above. When radiation is mixed with the other modes, however, the question arises as to what fraction of the heat flux should be corrected for emissivity and what fraction need not be. The different modes may in certain example embodiments be isolated by, for instance, using a heat flux sensor in a radiometer configuration to in essence "view" only the radiation sources. If the modes cannot be differentiated experimentally, it may become desirable to make intelligent estimates of the relative fractions of the heat flux each mode contributes. In these cases, the emissivity of the heat flux sensor may be made as high as possible to help minimize error.

Advantageously, the techniques described herein promote the development and qualification of systems (e.g., including windows and/or the like) that perform the same within a predefined tolerance. The solid-state system of certain example embodiments, which does not move, advantageously is rugged yet easy to manufacture. Moreover, certain example embodiments need not be powered, e.g., because it generates its own voltage, etc.

The terms "heat treatment" and "heat treating" as used herein mean heating the article to a temperature sufficient to achieve thermal tempering and/or heat strengthening of the glass-inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, up to about 10 minutes, up to 15 minutes, etc., in certain example embodiments.

The terms "peripheral" and "edge" used herein in connection with seals, for example, do not mean that the seal(s) and/or other element(s) is/are located at the absolute periphery or edge of the unit, but instead mean that the seal(s) and/or other element(s) is/are at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s).

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a glazing assembly is provided. It includes a first glass substrate; a radiation shield covering, directly or indirectly, at least a part of a peripheral edge area of the first glass substrate; and a dual junction solid-state heat flux sensor. The sensor includes a first junction oriented in the assembly at a first location at which radiation from a radiation source is receivable through the first glass substrate, a second junction oriented in the assembly at a second location that is blocked from the radiation source by the radiation shield, and circuitry configured to generate a signal based on a differential between transduced voltages respectively generated at the first and second junctions.

In addition to the features of the previous paragraph, in certain example embodiments, a control module may be configured to receive the signal and selectively generate an action responsive thereto.

In addition to the features of the previous paragraph, in certain example embodiments, the action may correspond to the activation or deactivation of a switchable product. For instance, the action may correspond to the activation or deactivation of a switchable product, activation or deactivation of a localized heating and/or cooling system, etc.

In addition to the features of the previous paragraph, in certain example embodiments, the switchable product may include an electrochromic film and/or a polymer-inclusive liquid crystal layer (e.g., of or including PDLC, PALC, and/or the like).

In addition to the features of any of the three previous paragraphs, in certain example embodiments, the control module may include a memory, the memory storing information about the received signal.

In addition to the features of any of the four previous paragraphs, in certain example embodiments, the control module may include a memory, the memory storing information about when actions are to be taken and one or more conditions that trigger each of the actions.

In certain example embodiments, a laminated product is provided. It may include the assembly of any one of the previous six paragraphs, along with a second glass substrate, and at least one laminating material provided between the first glass substrate of the assembly and the second glass substrate. The sensor of the assembly is located between the first glass substrate of the assembly and the second glass substrate. For instance, a switchable polymer-inclusive liquid crystal product may be provided, and the at least one laminating material may include first and second laminating materials, the first laminating material laminating the first glass substrate of the assembly to the switchable polymer-inclusive liquid crystal product, and the second laminating material laminating the second glass substrate to the switchable polymer-inclusive liquid crystal product. In certain example embodiments, an insulating glass (IG) unit is provided. It may include the assembly of any one of the previous six paragraphs, along with a second glass substrate, and a peripheral edge spacer helping to maintain the first glass substrate of the assembly and the second glass substrate in substantially parallel spaced apart relation to one another. The sensor of the assembly is located between the first glass substrate of the assembly and the second glass substrate. For instance, a control module may be configured to receive the signal from the glazing and generate a report on the performance of the IG unit as a whole. The report may include a real-time U-value measurement and/or a historical report of U-values in certain example embodiments, the report may suggest a likely failure of the IG unit as a whole, etc. In certain example embodiments, a vacuum insulating glass (VIG) unit is provided. It may include the assembly of any one of the previous six paragraphs, along with a second glass substrate in substantially parallel spaced apart relation to the first glass substrate of the assembly; a plurality of support spacers provided between the first glass substrate of the assembly and the second glass substrate; a peripheral edge seal provided around peripheral edges of the first glass substrate of the assembly and the second glass substrate; and a gap defined as including the area between the first glass substrate of the assembly and the second glass substrate and being within the peripheral edge seal, the gap being evacuated at a pressure less than atmospheric. For instance, a control module may be configured to receive the signal from the glazing and generate a report on the performance of the VIG unit as a whole, and the report may include a real-time U-value measurement and/or a historical report of U-values, the report may suggest a likely failure of the VIG unit as a whole, etc. In certain example embodiments, an automotive window comprising the assembly of any one of the six previous paragraphs is provided.

In addition to the features of any of the seven previous paragraphs, in certain example embodiments, the radiation shield may include a frame or sash.

In addition to the features of any of the eight previous paragraphs, in certain example embodiments, the radiation shield may include black fit.

In certain example embodiments, a method of making a glazing assembly is provided. At least a part of a peripheral edge area of a first glass substrate is covered, directly or indirectly, with a radiation shield. A dual junction solid-state heat flux sensor is connected to the first glass substrate, so that a first junction of the sensor is oriented in the assembly at a first location at which radiation from a radiation source is receivable through the glass substrate, and a second junction of the sensor is oriented in the assembly at a second location that is blocked from the radiation source by the radiation shield. Circuitry is configured to generate a signal based on a differential between transduced voltages respectively generated at the first and second junctions.

In addition to the features of the previous paragraph, in certain example embodiments, a control module may be connected to the assembly so that the control module is able to receive the signal and selectively generate an action responsive thereto.

In addition to the features of the previous paragraph, in certain example embodiments, the control module may be used to selectively trigger an action to be taken in a system external to the glazing, and/or an action to be taken with respect to the glazing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A switchable window glazing assembly, comprising:
    a switchable window including a first glass substrate and a second glass substrate;
    a radiation shield covering, directly or indirectly, at least a part of a peripheral edge area of the first glass substrate; and
    a dual junction solid-state heat flux sensor, comprising:
        a first junction oriented in the assembly at a first location at which radiation from a radiation source is receivable through the first glass substrate,
        a second junction oriented in the assembly at a second location that is blocked from the radiation source by the radiation shield, and
        circuitry configured to generate a signal based on a differential between transduced voltages respectively generated at the first and second junctions, so that the assembly is configured to adjust transmission of the switchable window based on the signal that is based on the differential by adjusting voltage applied to a liquid crystal layer provided between the first and second glass substrates.

2. The assembly of claim 1, further comprising a control module configured to receive the signal and selectively generate an action responsive thereto.

3. The assembly of claim 2, wherein the action corresponds to the activation or deactivation of a switchable product.

4. The assembly of claim 3, wherein the switchable product includes a polymer-inclusive liquid crystal layer.

5. The assembly of claim 2, wherein the control module includes a memory, the memory storing information about the received signal.

6. The assembly of claim 2, wherein the control module includes a memory, the memory storing information about when actions are to be taken and one or more conditions that trigger each of the actions.

7. The assembly of claim 1, wherein the radiation shield includes a frame or sash.

8. The assembly of claim 1, wherein the radiation shield includes black frit.

* * * * *